US011550706B1

(12) United States Patent
Teixeira

(10) Patent No.: US 11,550,706 B1
(45) Date of Patent: Jan. 10, 2023

(54) SYSTEM AND METHOD FOR IMPLEMENTING AN AUTOMATIC SCENARIO PATTERN GENERATING MODULE

(71) Applicant: JPMorgan Chase Bank, N.A., New York, NY (US)

(72) Inventor: Anne K Teixeira, Valrico, FL (US)

(73) Assignee: JPMORGAN CHASE BANK, N.A., New York, NY (US)

(*) Notice: Subject to any disclaimer, the term of this patent is extended or adjusted under 35 U.S.C. 154(b) by 0 days.

(21) Appl. No.: 17/444,865

(22) Filed: Aug. 11, 2021

(51) Int. Cl.
*G06F 8/60* (2018.01)
*G06F 11/36* (2006.01)
*G06F 8/35* (2018.01)

(52) U.S. Cl.
CPC .......... *G06F 11/3688* (2013.01); *G06F 8/35* (2013.01); *G06F 8/60* (2013.01); *G06F 11/3684* (2013.01)

(58) Field of Classification Search
CPC .......... G06F 8/35; G06F 8/60; G06F 11/3684; G06F 11/3688
See application file for complete search history.

(56) References Cited

U.S. PATENT DOCUMENTS

2021/0046349 A1* 2/2021 Kabasso ............ A63B 21/4027
2021/0182033 A1* 6/2021 Perez Alvarez ...... G06F 16/252

OTHER PUBLICATIONS

N. H. Bien and T. Dan Thu, "Multi-tenant web application framework architecture pattern," 2015 2nd National Foundation for Science and Technology Development Conference on Information and Computer Science (NICS), 2015, pp. 40-48, doi: 10.1109/NICS.2015.7302219. (Year: 2015).*

* cited by examiner

Primary Examiner — Hanh Thi-Minh Bui
(74) Attorney, Agent, or Firm — Greenblum & Bernstein, P.L.C.

(57) ABSTRACT

A system and method for automatically generating scenario patterns are disclosed. The system includes a processor; and a memory operatively connected to the processor via a communication interface. The processor receives a request to create new features in connection with development and/or testing of one or more applications; automatically generates scenario patterns corresponding to the new features by utilizing an automatic scenario patterns generating tool; outputs the scenario patterns in a predefined file format providing an end-2-end (E2E) view spanning multiple applications, state models and events; uploads the scenario patterns in the predefined file format onto a system different from the automatic scenario patterns generating tool; deploys corresponding application programming interface (API) on a private cloud to request the scenario patterns in the predefined file format from the system; and implements the requested scenario patterns to create the new features.

15 Claims, 10 Drawing Sheets

| Life Cycle 602 | Description 604 | Object (expected input/output) 606 | ID.VERSION.REVISION 608 |
|---|---|---|---|
| NEW | New payment or receipt | Payment.Initiation.Norm | PI1.V1.R1 + root1.V1 |
| | | Payment.Norm | PN1.V1.R1 + root1.V1 |
| | | Cash.Txn.Bookable | CB1.V1.R1 + root1.V1 |
| | | Journal/Holding [PENDING - POST] | J1 |
| | | Settlement Mission [OPEN] | SM1.V1.R1 + root1.V1 |
| | | Settlement Mission [SETTLED] | SM1.V2.R1 + root1.V1 |
| | | Journal/Holding [SETTLED - POST] | J2 |
| AMEND | Change to an existing pending payment or receipt | Payment.Initiation.Norm | PI1.V2.R1 + root1.V2 |
| | | Payment.Norm | PN1.V2.R1 + root1.V2 |
| | | Cash.Txn.Bookable | CB1.V2.R1 + root1.V2 |
| | | Journal/Holding [PENDING] - REVERSE/REPOST | J3 |
| | | Settlement Mission [CANCEL] | SM1.V2.R1 + root1.V2 |
| | | Settlement Mission [OPEN] | SM2.V1.R1 + root1.V2 |
| | | Settlement Mission [SETTLED] | SM2.V2.R1 + root1.V2 |
| | | Journal/Holding [SETTLED] - POST | J4 |
| CANCEL | Cancellation of existing pending payment | Payment.Initiation.Norm | PI1.V2.R1 + root1.V2 |
| | | Payment.Norm | PN1.V2.R1 + root1.V2 |
| | | Cash.Txn.Bookable | CB1.V2.R1 + root1.V2 |
| | | Journal/Holding [PENDING] - REVERSE | J3 |
| | | Settlement Mission [CANCEL] | SM1.V2.R1 + root1.V2 |

FIG. 6

SYSTEM AND METHOD FOR IMPLEMENTING AN AUTOMATIC SCENARIO PATTERN GENERATING MODULE

TECHNICAL FIELD

This disclosure generally relates to data processing, and, more particularly, to methods and apparatuses for implementing an automatic scenario pattern generating module that automatically generates visualization artifacts to articulate requirements, design and implementation for end-2-end (E2E) transactions spanning multiple components or applications.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

Today, across the multiple lines of businesses (LOB) at an organization, application developers are constantly faced with a daunting task of developing, testing, and deploying new applications for improving customer experience as well as productivity. As software applications become increasingly more complex, checking out the code, building, testing, and deploying such software applications also become more complex as a large number of unique combinations of paths and modules may be tested for each program. While conventional deployment and operational engines may help address some of the problem, one may still find that the deployment and operational focus required may be challenged at times based on other functional delivery priorities and operations experiences.

For example, Specification by example (SbE) is a collaborative approach to defining requirements and business-oriented functional tests for software products based on capturing and illustrating requirements using realistic examples instead of abstract statements. SbE may be applied in the context of agile software development methods, in particular behavior-driven development. This approach may be particularly successful for managing requirements and functional tests on large-scale projects of significant domain and organizational complexity. However, traditionally, SbE focuses on a single input/output and is very one dimensional, thereby lacking the capability of providing a more E2E view spanning multiple applications, state models and events.

Thus, there is a need for additional visualization artifacts to articulate requirements, design and implementation for E2E transactions spanning multiple components or applications.

SUMMARY

The present disclosure, through one or more of its various aspects, embodiments, and/or specific features or sub-components, provides, among other features, various systems, servers, devices, methods, media, programs, and platforms for implementing an automatic scenario pattern generating module that automatically generates visualization artifacts to articulate requirements, design and implementation for E2E transactions spanning multiple components or applications, but the disclosure is not limited thereto.

According to an aspect of the present disclosure, scenario patterns may be transaction life cycle event and state modelling method/pattern where by an E2E view spanning multiple components, applications, functions and use cases may be specified with a view of completing a transaction E2E, but the disclosure is not limited thereto. According to exemplary embodiments, the resultant artifact provided by the automatic scenario pattern generating module may be utilized for development i.e. sprint input and also for testing e.g. uploaded into a tool (e.g., Cockpit, Cucumber, Fitnesse, etc., but the disclosure is not limited thereto) for E2E and system integration testing. The automatic scenario pattern generating module, according to an aspect of the present disclosure, may be configured to product these patterns automatically.

According to an aspect of the present disclosure, these scenario patterns may be produced in a summary or short form. According to another aspect of the present disclosure, these scenario patterns may be produced in a more detailed form.

According to an aspect of the present disclosure, a method for automatically generating scenario patterns by utilizing one or more processors and one or more memories is disclosed. The method may include: receiving a request to create new features in connection with development and/or testing of one or more applications; implementing an automatic scenario patterns generating tool in response to the received request; automatically generating scenario patterns corresponding to the new features by utilizing the automatic scenario patterns generating tool; outputting the scenario patterns in a predefined file format providing an end-2-end (E2E) view spanning multiple applications, state models and events; uploading the scenario patterns in the predefined file format onto a system different from the automatic scenario patterns generating tool; deploying corresponding application programming interface (API) on a private cloud to request the scenario patterns in the predefined file format from the system; and implementing the requested scenario patterns to create the new features.

According to yet another aspect of the present disclosure, the system may be an application development tool, and the method may further include: uploading the scenario patterns in the predefined file format onto the application development tool; deploying the API on the private cloud to request the scenario patterns in the predefined file format from the application development tool; implementing the requested scenario patterns as specification-by-example (SbE) to create the new features; and developing said one or more applications with the new features.

According to another aspect of the present disclosure, the system may be an application testing tool, and the method may further include: uploading the scenario patterns in the predefined file format onto the application testing tool; deploying the API on the private cloud to request the scenario patterns in the predefined file format from the application testing tool; implementing the requested scenario patterns to create test cases; and testing said one or more applications with the test cases. The testing tool may include one or more of the following testing tools: Cockpit, Cucumber, Fitnesse, but the disclosure is not limited thereto.

According to a further aspect of the present disclosure, the scenario patterns may be transaction life cycle event and state modelling method or pattern having an E2E view spanning multiple components, applications, functions and may use case scenarios specified with a view of completing a transaction E2E. According to an additional aspect of the present disclosure, wherein output of the scenario patterns in a predefined file format may be dependent upon the use case scenarios.

According to a further aspect of the present disclosure, the method may further include automatically generating the scenario patterns for a financial transaction processing system (FTPS) target architecture model, wherein a single scenario pattern demonstrates a single payments or receivables scenario feature as it progresses through various lifecycle points.

According to yet another aspect of the present disclosure, the predefined file format may include one or more of the following: excel file format and proto message file format, but the disclosure is not limited thereto.

According to another aspect of the present disclosure, a system for automatically generating scenario patterns is disclosed. The system may include: a processor; and a memory operatively connected to the processor via a communication interface, the memory storing computer readable instructions, when executed, cause the processor to: receive a request to create new features in connection with development and/or testing of one or more applications; implement an automatic scenario patterns generating tool in response to the received request; automatically generate scenario patterns corresponding to the new features by utilizing the automatic scenario patterns generating tool; output the scenario patterns in a predefined file format providing an end-2-end (E2E) view spanning multiple applications, state models and events; upload the scenario patterns in the predefined file format onto a system different from the automatic scenario patterns generating tool; deploy corresponding application programming interface (API) on a private cloud to request the scenario patterns in the predefined file format from the system; and implement the requested scenario patterns to create the new features.

According to yet another aspect of the present disclosure, wherein the system may be an application development tool, and the processor may be further configured to: upload the scenario patterns in the predefined file format onto the application development tool; deploy the API on the private cloud to request the scenario patterns in the predefined file format from the application development tool; implement the requested scenario patterns as specification-by-example (SbE) to create the new features; and develop said one or more applications with the new features.

According to a further aspect of the present disclosure, wherein the system may be an application testing tool, and the processor may be further configured to: upload the scenario patterns in the predefined file format onto the application testing tool; deploy the API on the private cloud to request the scenario patterns in the predefined file format from the application testing tool; implement the requested scenario patterns to create test cases; and test said one or more applications with the test cases.

According to a further aspect of the present disclosure, the processor may be further configured to automatically generate the scenario patterns for a financial transaction processing system (FTPS) target architecture model, wherein a single scenario pattern demonstrates a single payments or receivables scenario feature as it progresses through various lifecycle points.

According to yet another aspect of the present disclosure, a non-transitory computer readable medium configured to store instructions for automatically generating scenario patterns is disclosed. The instructions, when executed, may cause a processor to perform the following: receiving a request to create new features in connection with development and/or testing of one or more applications; implementing an automatic scenario patterns generating tool in response to the received request; automatically generating scenario patterns corresponding to the new features by utilizing the automatic scenario patterns generating tool; outputting the scenario patterns in a predefined file format providing an end-2-end (E2E) view spanning multiple applications, state models and events; uploading the scenario patterns in the predefined file format onto a system different from the automatic scenario patterns generating tool; deploying corresponding application programming interface (API) on a private cloud to request the scenario patterns in the predefined file format from the system; and implementing the requested scenario patterns to create the new features.

According to yet another aspect of the present disclosure, the system may be an application development tool, and the instructions, when executed, may further cause the processor to perform the following: uploading the scenario patterns in the predefined file format onto the application development tool; deploying the API on the private cloud to request the scenario patterns in the predefined file format from the application development tool; implementing the requested scenario patterns as specification-by-example (SbE) to create the new features; and developing said one or more applications with the new features.

According to another aspect of the present disclosure, the system may be an application testing tool, and the instructions, when executed, may further cause the processor to perform the following: uploading the scenario patterns in the predefined file format onto the application testing tool; deploying the API on the private cloud to request the scenario patterns in the predefined file format from the application testing tool; implementing the requested scenario patterns to create test cases; and testing said one or more applications with the test cases.

According to a further aspect of the present disclosure, the instructions, when executed, may further cause the processor to perform the following: automatically generating the scenario patterns for a financial transaction processing system (FTPS) target architecture model, wherein a single scenario pattern demonstrates a single payments or receivables scenario feature as it progresses through various lifecycle points.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

FIG. 6 illustrates exemplary use cases implemented by the automatic scenario pattern generating module of FIG. 4 in accordance with an exemplary embodiment.

DETAILED DESCRIPTION

Figure 1:
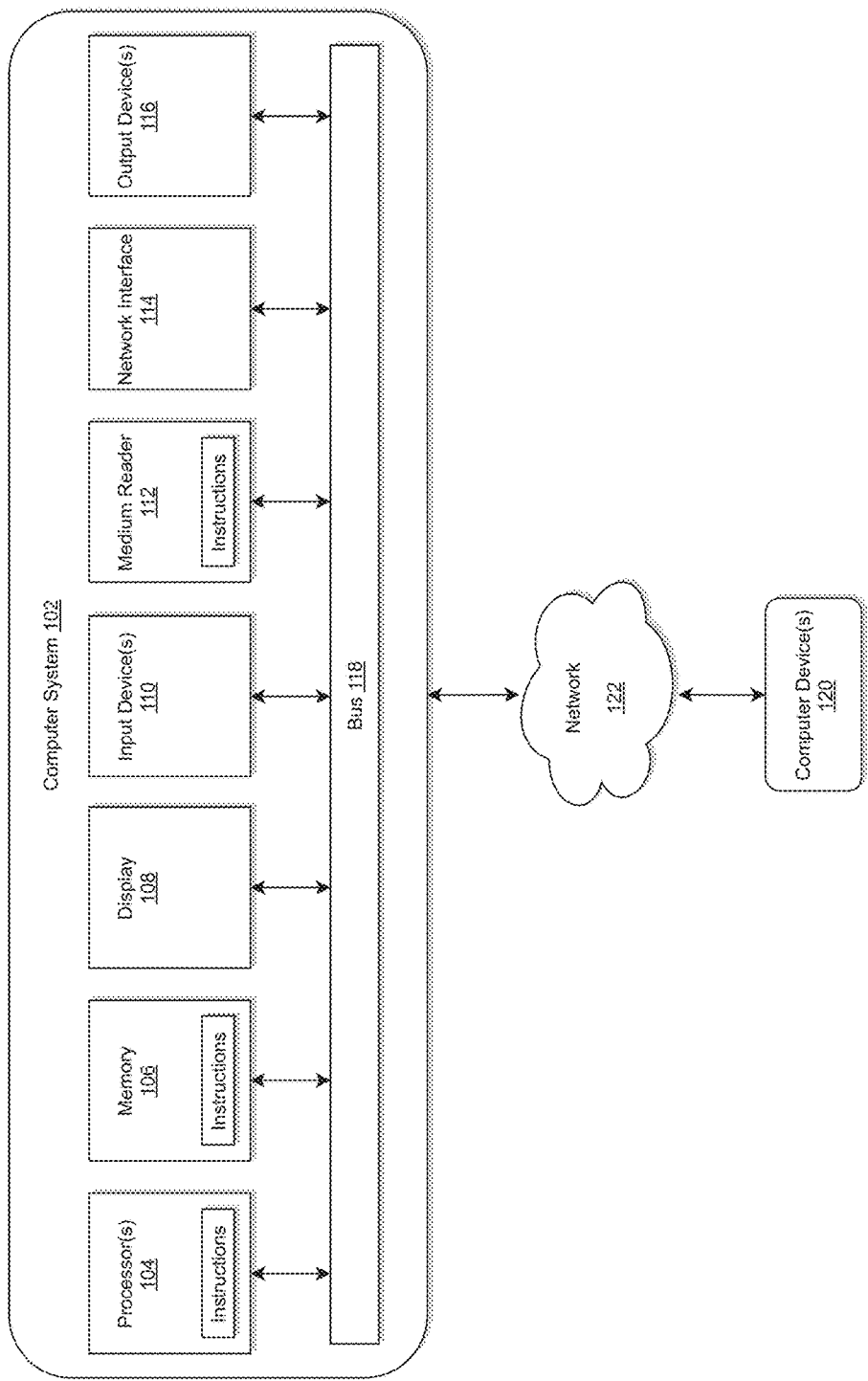
FIG. 1 illustrates a computer system for implementing an automatic scenario pattern generating module that automatically generates visualization artifacts to articulate requirements, design and implementation for end-2-end (E2E) transactions spanning multiple components or applications in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 is an exemplary system for use in implementing an automatic scenario pattern generating module in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

Figure 2:
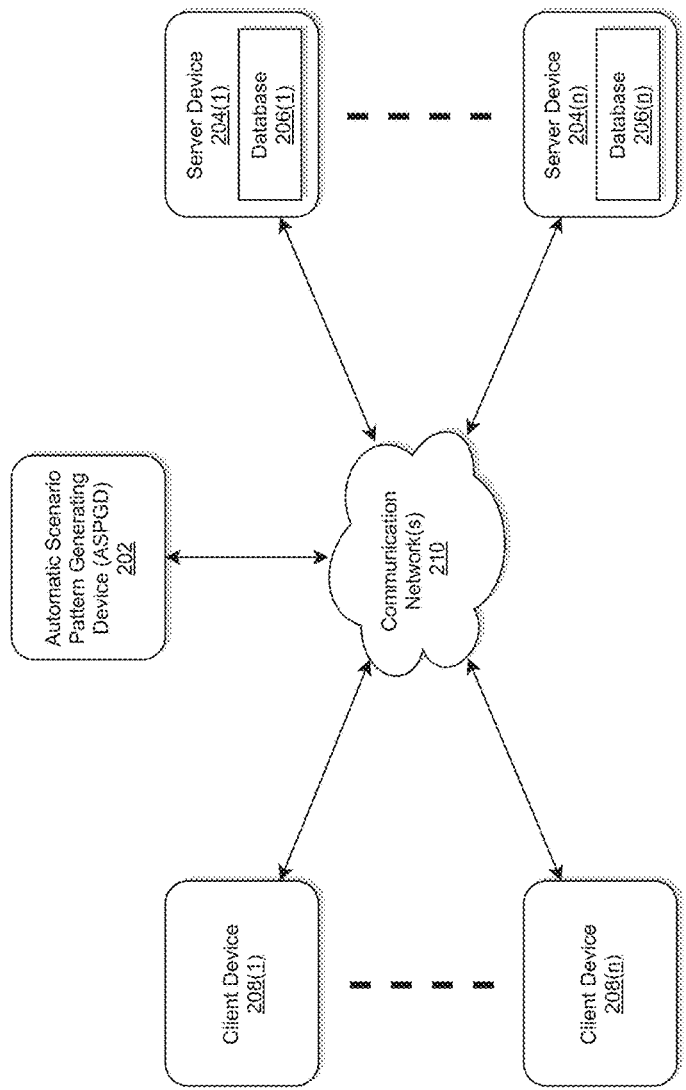
FIG. 2 illustrates an exemplary diagram of a network environment with an automatic scenario pattern generating device in accordance with an exemplary embodiment.

Referring to FIG. 2, a schematic of an exemplary network environment 200 with an automatic scenario pattern generating device (ASPGD) of the instant disclosure is illustrated.

According to exemplary embodiments, the above-described problems associated with conventional approach may be overcome by implementing an ASPGD 202 as illustrated in FIG. 2 that may provide a platform for implementing an automatic scenario pattern generating module that automatically generates visualization artifacts to articulate requirements, design and implementation for E2E transactions spanning multiple components or applications, but the disclosure is not limited thereto.

The ASPGD 202 may be the same or similar to the computer system 102 as described with respect to FIG. 1.

The ASPGD 202 may store one or more applications that can include executable instructions that, when executed by the ASPGD 202, cause the ASPGD 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the ASPGD 202 itself, may be located in virtual server(s) running in a cloud-based computing environment rather than being tied to one or more specific physical network computing devices. Also, the application(s) may be running in one or more virtual machines (VMs) executing on the ASPGD 202. Additionally, in one or more embodiments of this technology, virtual machine(s) running on the ASPGD 202 may be managed or supervised by a hypervisor.

In the network environment 200 of FIG. 2, the ASPGD 202 is coupled to a plurality of server devices 204(1)-204(n) that hosts a plurality of databases 206(1)-206(n), and also to a plurality of client devices 208(1)-208(n) via communication network(s) 210. A communication interface of the ASPGD 202, such as the network interface 114 of the computer system 102 of FIG. 1, operatively couples and communicates between the ASPGD 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the ASPGD 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 202 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The ASPGD 202 may be a standalone device or integrated with one or more other devices or apparatuses, such as one or more of the server devices 204(1)-204(n), for example. In one particular example, the ASPGD 202 may be hosted by one of the server devices 204(1)-204(n), and other arrangements are also possible. Moreover, one or more of the devices of the ASPGD 202 may be in the same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the ASPGD 202 via the communication network(s) 210 according to the HTTP-based and/or JavaScript Object Notation (JSON) protocol, for example, although other protocols may also be used. According to a further aspect of the present disclosure, wherein the user interface may be a Hypertext Transfer Protocol (HTTP) web interface, but the disclosure is not limited thereto.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the ASPGD 202 that may efficiently provide a platform for implementing an automatic scenario pattern generating module that automatically generates visualization artifacts to articulate requirements, design and implementation for E2E transactions spanning multiple components or applications, but the disclosure is not limited thereto.

The client devices 208(1)-208(n) may run interface applications, such as standard web browsers or standalone client applications, which may provide an interface to communicate with the ASPGD 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the ASPGD 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the ASPGD 202, the server devices 204(1)-204(n), or the client devices 208(1)-208(n), for example, may be configured to operate as virtual instances on the same physical machine. For example, one or more of the ASPGD 202, the server devices 204(1)-204(n), or the client devices 208(1)-208(n) may operate on the same physical device rather than as separate devices communicating through communication network(s) 210. Additionally, there may be more or fewer ASPGDs 202, server devices 204(1)-204(n), or client devices 208(1)-208(n) than illustrated in FIG. 2. According to exemplary embodiments, the ASPGD 202 may be configured to send code at run-time to remote server devices 204(1)-204(n), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
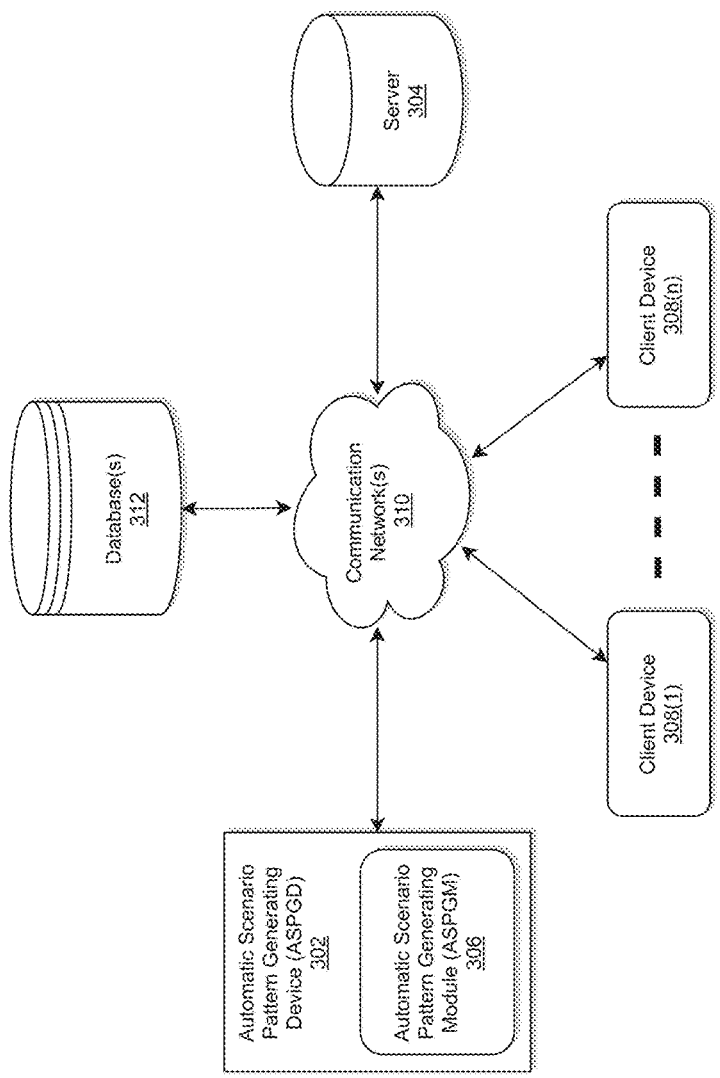
FIG. 3 illustrates a system diagram for implementing an automatic scenario pattern generating device with an automatic scenario pattern generating module in accordance with an exemplary embodiment.

FIG. 3 illustrates a system diagram for implementing an automatic scenario pattern generating device (ASPGD) having an automatic scenario pattern generating module (ASPGM) that can automatically generate visualization artifacts to articulate requirements, design and implementation for E2E transactions spanning multiple components or applications in accordance with an exemplary embodiment, but the disclosure is not limited thereto.

As illustrated in FIG. 3, the system 300 may include an ASPGD 302 within which an ASPGM 306 is embedded, a server 304, a database(s) 312, a plurality of client devices 308(1) . . . 308(n), and a communication network 310.

According to exemplary embodiments, the ASPGD 302 including the ASPGM 306 may be connected to the server 304, and the database(s) 312 via the communication network 310. Although there is only one database has been illustrated, the disclosure is not limited thereto. Any number of databases may be utilized. The ASPGD 302 may also be connected to the plurality of client devices 308(1) . . . 308(n) via the communication network 310, but the disclosure is not limited thereto.

According to exemplary embodiment, the ASPGD 302 is described and shown in FIG. 3 as including the ASPGM 306, although it may include other rules, policies, modules, databases, or applications, for example. According to exemplary embodiments, the database(s) 312 may be embedded within the ASPGD 302. According to exemplary embodiments, the database(s) 312 may be configured to store configuration details data corresponding to application design data, testing data, scenario patterns data, file format data, user information data etc., but the disclosure is not limited thereto.

According to exemplary embodiments, the ASPGM 306 may be configured to receive real-time feed of data from the plurality of client devices 308(1) . . . 308(n) via the communication network 310.

According to exemplary embodiments, as will be described below, the ASPGM 306 may be configured to receive a request to create new features in connection with development and/or testing of one or more applications; implement an automatic scenario patterns generating tool in response to the received request; automatically generate scenario patterns corresponding to the new features by utilizing the automatic scenario patterns generating tool; output the scenario patterns in a predefined file format providing an end-2-end (E2E) view spanning multiple applications, state models and events; upload the scenario patterns in the predefined file format onto a system different from the automatic scenario patterns generating tool; deploy corresponding application programming interface (API) on a private cloud to request the scenario patterns in the predefined file format from the system; and implement the requested scenario patterns to create the new features, but the disclosure is not limited thereto.

The plurality of client devices 308(1) . . . 308(n) are illustrated as being in communication with the ASPGD 302. In this regard, the plurality of client devices 308(1) . . . 308(n) may be "clients" of the ASPGD 302 and are described herein as such. Nevertheless, it is to be known and understood that the plurality of client devices 308(1) . . . 308(n) need not necessarily be "clients" of the ASPGD 302, or any entity described in association therewith herein. Any additional or alternative relationship may exist between either or both of the plurality of client devices 308(1) . . . 308(n) and the ASPGD 302, or no relationship may exist.

The first client device 308(1) may be, for example, a smart phone. Of course, the first client device 308(1) may be any additional device described herein. The second client device 308(n) may be, for example, a personal computer (PC). Of course, the second client device 308(n) may also be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, one or more of the plurality of client devices 308(1) . . . 308(n) may communicate with the ASPGD 302 via broadband or cellular communication. Of course, these embodiments are merely exemplary and are not limiting or exhaustive.

The computing device 301 may be the same or similar to any one of the client devices 208(1)-208(n) as described with respect to FIG. 2, including any features or combination of features described with respect thereto. The ASPGD 302 may be the same or similar to the ASPGD 202 as described with respect to FIG. 2, including any features or combination of features described with respect thereto.

Figure 4:
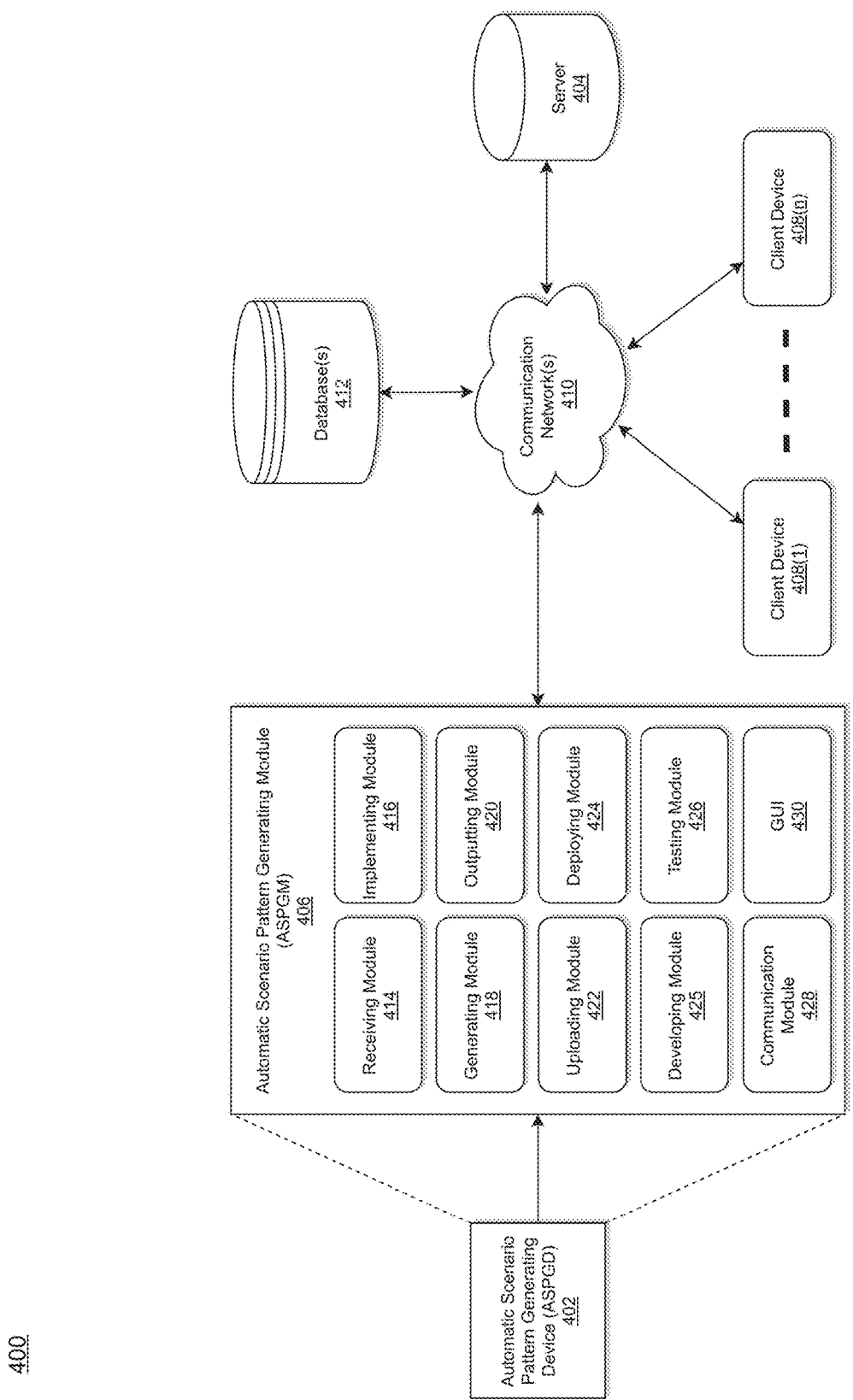
FIG. 4 illustrates a system diagram for implementing an automatic scenario pattern generating module of FIG. 3 in accordance with an exemplary embodiment.

FIG. 4 illustrates a system diagram for implementing an automatic scenario pattern generating module (ASPGM) of FIG. 3 that can automatically generate visualization artifacts to articulate requirements, design and implementation for E2E transactions spanning multiple components or applications in accordance with an exemplary embodiment.

According to exemplary embodiments, the system 400 may include an automatic scenario pattern generating device (ASPGD) 402 within which an automatic scenario pattern generating (ASPGM) 406 is embedded, a server 404, a database(s) 412, and a communication network 410.

According to exemplary embodiments, the ASPGD 402 including the ASPGM 406 may be connected to the server 404, and the database(s) 412 via the communication network 410. The ASPGD 402 may also be connected to the plurality of client devices 408(1) ... 408(n) via the communication network 410, but the disclosure is not limited thereto. According to exemplary embodiments, the ASPGD 402, the ASPGM 406, the database(s) 412, the server 404, the client devices 408(1)-408(n), and the communication network 410 as illustrated in FIG. 4 may be the same or similar to the ASPGD 302, the ASPGM 306, the database(s) 312, the server 304, the client devices 308(1)-308(n), and the communication network 310, respectively, as illustrated in FIG. 3.

According to exemplary embodiments, as illustrated in FIG. 4, the ASPGM 406 may include a receiving module 414, an implementing module 416, a generating module 418, an outputting module 420, an uploading module 422, a deploying module 424, a testing module 426, a communication module 428, and a graphical user interface (GUI) 430.

The process may be executed via the communication module 428 and the communication network 410, which may comprise plural networks as described above. For example, in an exemplary embodiment, the various components of the ASPGM 406 may communicate with the server 404, and the database(s) 412 via the communication module 428 and the communication network 410. Of course, these embodiments are merely exemplary and are not limiting or exhaustive.

According to exemplary embodiments, the communication network 410 and the communication module 428 may be configured to establish a link between the database(s) 412, the client devices 408(1)-408(n) and the ASPGM 406.

According to exemplary embodiments, each of the receiving module 414, implementing module 416, generating module 418, outputting module 420, uploading module 422, deploying module 424, developing module 425, testing module 426, and the communication module 428 as illustrated in FIG. 4 may be implemented by microprocessors or similar, they may be programmed using software (e.g., microcode) to perform various functions discussed herein and may optionally be driven by firmware and/or software. Alternatively, each of the receiving module 414, implementing module 416, generating module 418, outputting module 420, uploading module 422, deploying module 424, developing module 425, testing module 426, and the communication module 428 may be implemented by dedicated hardware, or as a combination of dedicated hardware to perform some functions and a processor (e.g., one or more programmed microprocessors and associated circuitry) to perform other functions. Also, according to exemplary embodiments, each of the receiving module 414, implementing module 416, generating module 418, outputting module 420, uploading module 422, deploying module 424, developing module 425, testing module 426, and the communication module 428 may be physically separated into two or more interacting and discrete blocks, units, devices, and/or modules without departing from the scope of the inventive concepts.

According to exemplary embodiments, each of the receiving module 414, implementing module 416, generating module 418, outputting module 420, uploading module 422, deploying module 424, developing module 425, testing module 426, and the communication module 428 of the ASPGM 406 may be called by corresponding API, but the disclosure is not limited thereto.

According to exemplary embodiments, the receiving module 414 may be configured to receive a request to create new features in connection with development and/or testing of one or more applications.

According to exemplary embodiments, the implementing module 416 may be configured to implement an automatic scenario patterns generating tool in response to the received request.

According to exemplary embodiments, the generating module 418 may be configured to automatically generate scenario patterns corresponding to the new features.

According to exemplary embodiments, the outputting module 420 may be configured to output the scenario patterns in a predefined file format providing an end-2-end (E2E) view spanning multiple applications, state models and events.

According to exemplary embodiments, the uploading module 422 may be configured to upload the scenario patterns in the predefined file format onto a system different from the automatic scenario patterns generating tool. According to exemplary embodiments, the ASPGM 406 may be referred to as an automatic scenario patterns generating tool.

According to exemplary embodiments, the deploying module 424 may be configured to deploy corresponding application programming interface (API) on a private cloud to request the scenario patterns in the predefined file format from the system.

According to exemplary embodiments, the implementing module 416 may be configured to implement the requested scenario patterns to create the new features.

Figure 7:
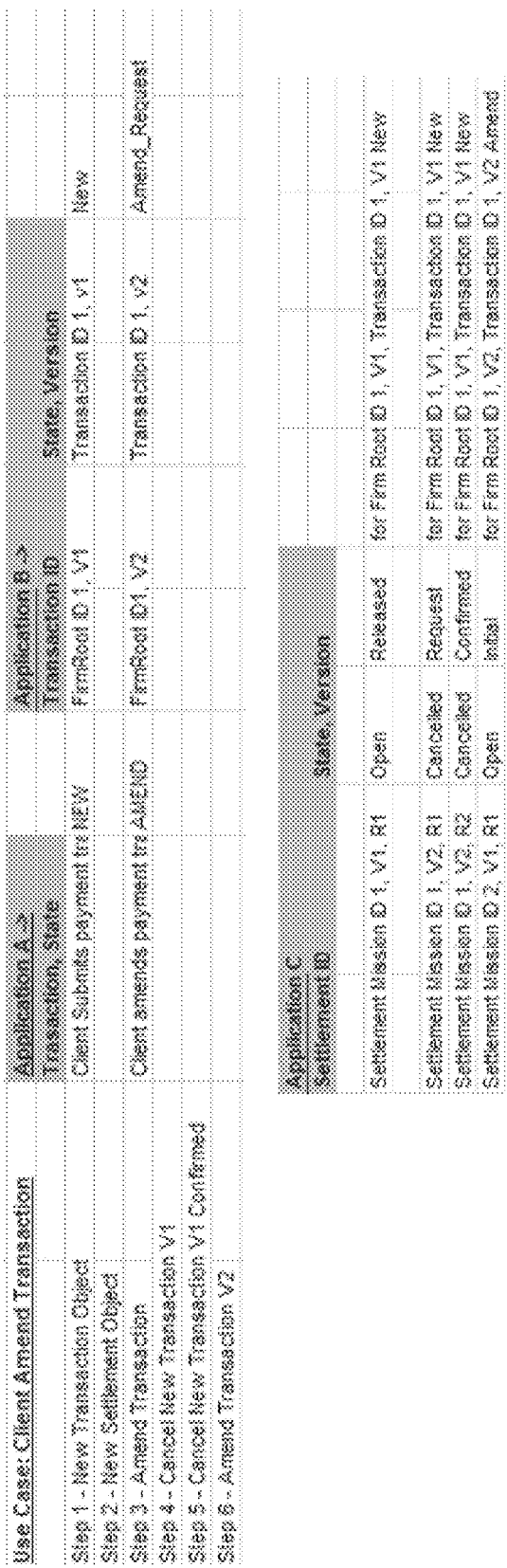
FIG. 7 illustrates a summary view of an output provided by the automatic scenario pattern generating module of FIG. 4 in accordance with an exemplary embodiment.

According to exemplary embodiments, these scenario patterns may be produced in a summary or short form, see, e.g., an output 700 in FIG. 7 by utilizing the GUI 430. According to exemplary embodiments, these scenario patterns may be produced in a more detailed form, see, e.g., output 800a in FIG. 8A and output 800b in FIG. 8B by utilizing the GUI 430.

According exemplary embodiments, the system that is different from the automatic scenario patterns generating tool may be an application development tool. The uploading module 422 may be configured to upload the scenario patterns in the predefined file format onto the application development tool. The deploying module 424 may be configured to deploying the API on the private cloud to request the scenario patterns in the predefined file format from the application development tool. The implementing module 416 may be configured to implement the requested scenario patterns as specification-by-example (SbE) to create the new features. The developing module 425 may be configured to develop the one or more applications with the new features.

According to exemplary embodiments, the system that is different from the automatic scenario patterns generating tool may be an application testing tool. The uploading module 422 may be configured to upload the scenario patterns in the predefined file format onto the application testing tool. The deploying module 424 may be configured to deploy the API on the private cloud to request the scenario patterns in the predefined file format from the application testing tool. The implementing module 416 may be configured to implement the requested scenario patterns to create test cases and the testing module 426 may be configured to test the one or more applications with the test cases. According to exemplary embodiments, the testing tool may include one or more of the following testing tools: Cockpit, Cucumber, Fitnesse, but the disclosure is not limited thereto.

According exemplary embodiments, the scenario patterns may be transaction life cycle event and state modelling method or pattern having an E2E view spanning multiple components, applications, functions and may use case scenarios specified with a view of completing a transaction E2E. According to exemplary embodiments, wherein output of the scenario patterns in a predefined file format may be dependent upon the use case scenarios (see, e.g., FIGS. 6-8).

According to exemplary embodiments, the generating module 418 may be configured to automatically generate the scenario patterns for a financial transaction processing system (FTPS) target architecture model, wherein a single scenario pattern demonstrates a single payments or receivables scenario feature as it progresses through various lifecycle points.

According to exemplary embodiments, the predefined file format may include one or more of the following: excel file format and proto message file format, but the disclosure is not limited thereto.

Figure 5:
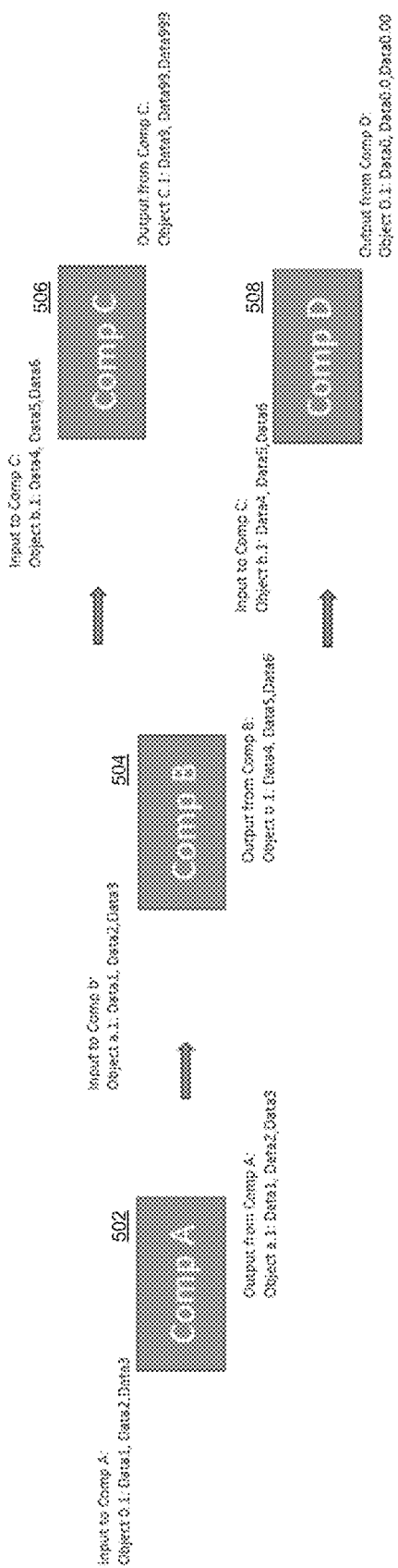
FIG. 5 illustrates an exemplary architecture diagram implemented by the automatic scenario pattern generating module of FIG. 4 in accordance with an exemplary embodiment.

FIG. 5 illustrates an exemplary architecture diagram 500 implemented by the ASPGM 406 of FIG. 4 in accordance with an exemplary embodiment.

As illustrated in the exemplary architecture diagram 500 of FIG. 5, each of the components, i.e., Comp A 502, Comp B 504, Comp C 506, and Comp D 508) performs a set of capabilities/functions that work together to provide product features example. There are expected data inputs and expected data outputs for each component which is dependent on the scenario pattern. The data inputs/outputs E2E for all components define what a scenario pattern is. The scenario pattern is used to: articulate requirements for each component development; articulate how for different scenarios there are different inputs and outputs and thus 'mimicking' E2E behavior; used for system integration testing, user acceptance and regression testing as disclosed above with respect to FIG. 4.

For example, input to Comp A 502 may include Object 0.1: Data1, Data2, Data3 and output from Comp A 502 may include Object a.1: Data1, Data2, Data3; input to Comp B 504 may include Object a.1: Data1, Data2, Data3 and output from Comp B 504 may include Object b.1: Data4, Data5, Data6; input to Comp C 506 may include Object b.1: Data4, Data5, Data6 and output from Comp C 406 may include Object C.1: Data9, Data99, Data999; input to Comp D 508 may include Object b.1: Data4, Data5, Data6 and output from Comp D 408 may include Object D.1: Data0, Data0.0, Data0.00, but the disclosure is not limited thereto.

FIG. 6 illustrates a GUI 600 illustrating exemplary use cases implemented by the ASPGM 406 of FIG. 4 in accordance with an exemplary embodiment. In this exemplary embodiments, the GUI 600 illustrates three scenarios, but the disclosure is not limited thereto. For example, the GUI 600 illustrates a table that includes a life cycle column 602, a description column 604, an object (expected input/output) column 606 and an ID.Version.Revision column 608, but the disclosure is not limited thereto. Any number of columns may be illustrated depending on desired use case. The exemplary use cases may be displayed by utilizing the GUI 430.

As illustrated in the exemplary life cycle column 602, first scenario may be "NEW", second scenario may be "AMEND", and the third scenario may be "CANCEL," but the disclosure is not limited thereto. Any number of scenarios may be illustrated depending on desired use case. As illustrated in the exemplary description column 604, which describes the corresponding scenario from the life cycle column 602.

For example, the description of the first scenario may be "new payment or receipt." According to corresponding Object (expected input/output) column 606 for this first scenario, a user may expect seven inputs/outputs (summary of the object) for the new payment or receipt, e.g., Payment.Initiation.Norm; Payment.Norm; Cash.Txn.Bookable; Journal/Holding [PENDING—POST]; Settlement Mission [OPEN]; Settlement Mission [SETTLED]; and Journal/Holding [SETTLED—POST], but the disclosure is not limited thereto. The ID.Version.Revision column 608 lists identification information for each corresponding expected seven inputs/outputs for the new payment or receipt scenario, but the disclosure is not limited thereto.

According to exemplary embodiments, the description of the second scenario may be "change to an existing pending payment or receipt." According to corresponding Object (expected input/output) column 606 for this second scenario, a user may expect eight inputs/outputs (summary of the object) for the change to an existing pending payment or receipt, e.g., Payment. Initiation.Norm; Payment.Norm; Cash.Txn.Bookable; Journal/Holding [PENDING]—REVERSE/REPOST; Settlement Mission [CANCEL]; Settlement Mission [OPEN]; Settlement Mission [SETTLED]; and Journal/Holding [SETTLED]—POST, but the disclosure is not limited thereto. The ID.Version.Revision column 608 lists identification information for each corresponding expected eight inputs/outputs for the change to an existing pending payment or receipt scenario, but the disclosure is not limited thereto.

According to exemplary embodiments, the description of the third scenario may be "cancellation of existing pending payment." According to corresponding Object (expected input/output) column 606 for this third scenario, a user may expect five inputs/outputs (summary of the object) for the cancellation of existing pending payment, e.g., Payment.Initiation.Norm; Payment.Norm; Cash.Txn.Bookable; Journal/Holding [PENDING] — REVERSE; and Settlement Mission [CANCEL], but the disclosure is not limited thereto. The ID.Version.Revision column 608 lists identification information for each corresponding expected five inputs/outputs for the cancellation of existing pending payment scenario, but the disclosure is not limited thereto.

FIG. 7 illustrates a summary view of an output 700 provided by the ASPGM 406 of FIG. 4 in accordance with an exemplary embodiment. The GUI 430 may be utilized to display the summary view of the output 700 (i.e., scenario pattern—summary example).

Figure 8A:
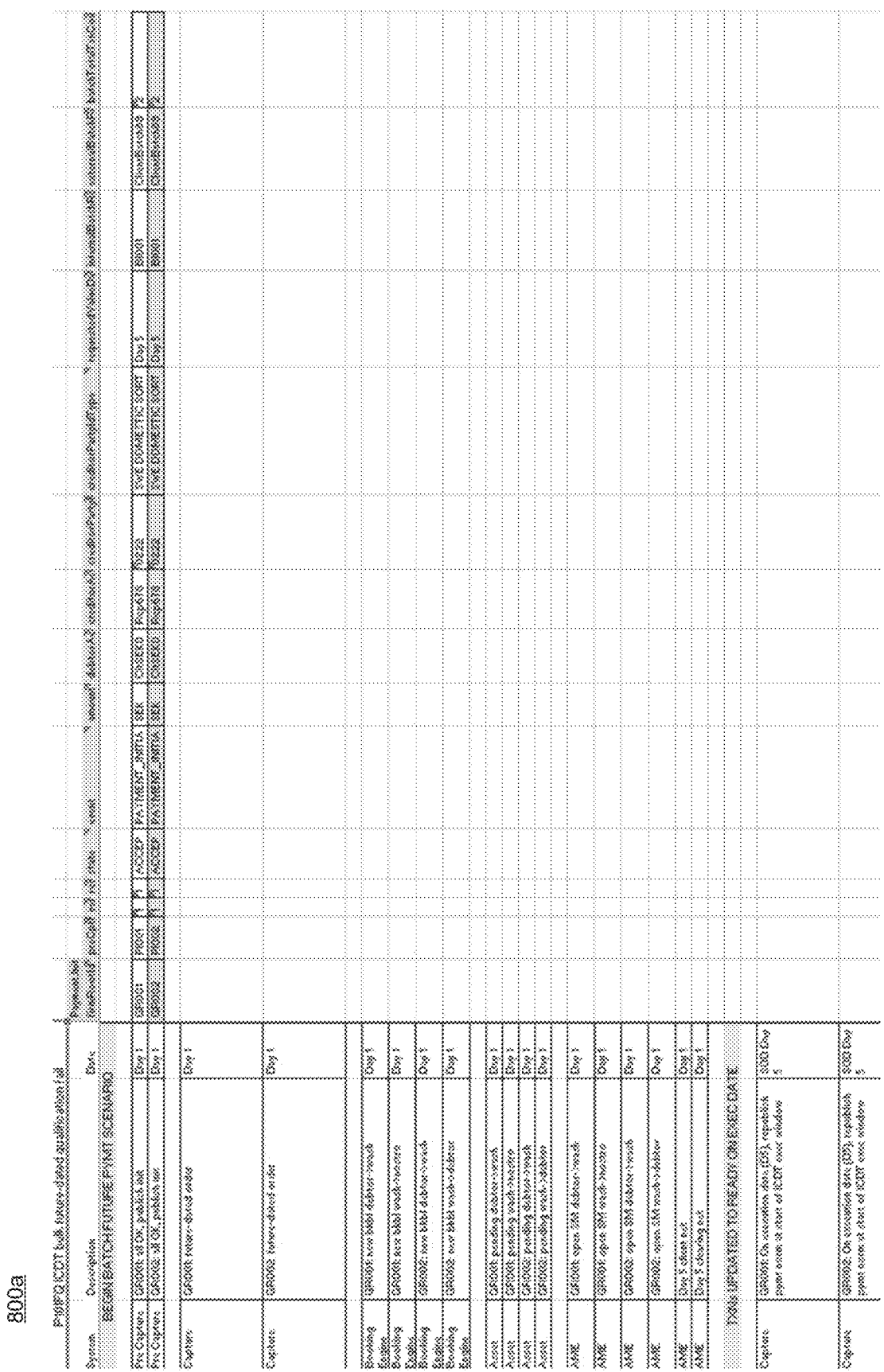
FIGS. 8A and 8B in combination illustrate a more detailed view of an output provided by the automatic scenario pattern generating module of FIG. 4 in accordance with an exemplary embodiment.
Figure 8B:
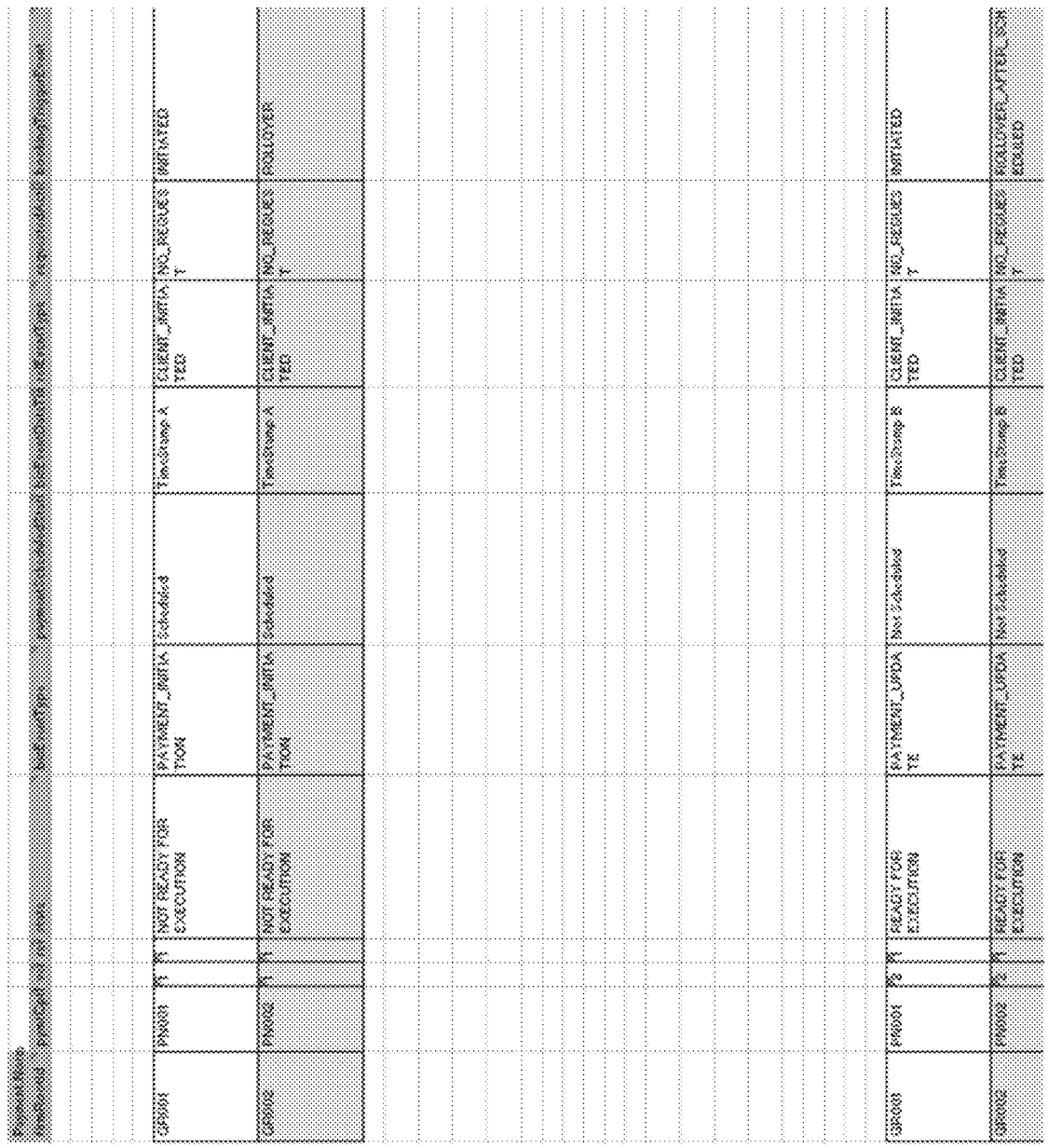

FIGS. 8A and 8B, in combination, illustrate a more detailed view of an output 800a and 800b, respectively, provided by the ASPGM 406 of FIG. 4 in accordance with an exemplary embodiment. The GUI 430 may be utilized to display the combination of output 800a and output 800b (i.e., scenario pattern—detailed example).

Figure 9:
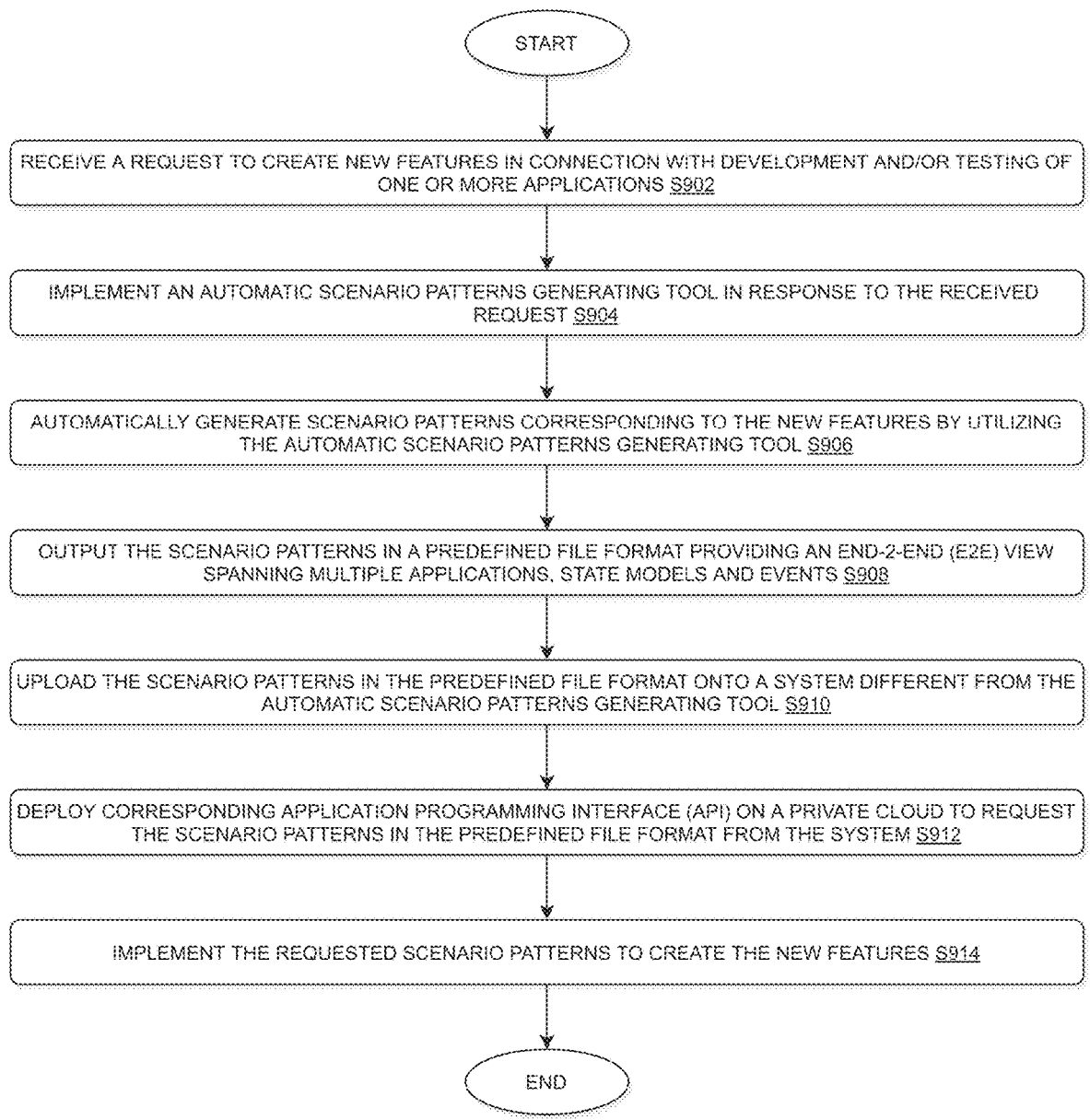
FIG. 9 illustrates a flow chart of automatically generating visualization artifacts by the automatic scenario pattern generating module of FIG. 4 in accordance with an exemplary embodiment.

FIG. 9 illustrates a flow chart of a process 900 implemented by the ASPGM 409 of FIG. 4 for automatically generating visualization artifacts in accordance with an exemplary embodiment. It will be appreciated that the illustrated process 900 and associated steps may be performed in a different order, with illustrated steps omitted, with additional steps added, or with a combination of reordered, combined, omitted, or additional steps.

As illustrated in FIG. 9, at step 902, the process 900 may include receiving a request to create new features in connection with development and/or testing of one or more applications.

At step 904, the process 900 may include implementing an automatic scenario patterns generating tool in response to the received request.

At step 906, the process 900 may include automatically generating scenario patterns corresponding to the new features by utilizing the automatic scenario patterns generating tool.

At step 908, the process 900 may include outputting the scenario patterns in a predefined file format providing an E2E view spanning multiple applications, state models and events.

At step 910, the process 900 may include uploading the scenario patterns in the predefined file format onto a system different from the automatic scenario patterns generating tool.

At step 912, the process 900 may include deploying corresponding application programming interface (API) on a private cloud to request the scenario patterns in the predefined file format from the system.

At step 914, the process 900 may include implementing the requested scenario patterns to create the new features.

According to exemplary embodiments, the system may be an application development tool, and the process 900 may further include: uploading the scenario patterns in the predefined file format onto the application development tool; deploying the API on the private cloud to request the scenario patterns in the predefined file format from the application development tool; implementing the requested scenario patterns as specification-by-example (SbE) to create the new features; and developing said one or more applications with the new features.

According to exemplary embodiments, the system may be an application testing tool, and the process 900 may further include: uploading the scenario patterns in the predefined file format onto the application testing tool; deploying the API on the private cloud to request the scenario patterns in the predefined file format from the application testing tool; implementing the requested scenario patterns to create test cases; and testing said one or more applications with the test cases. The testing tool may include one or more of the following testing tools: Cockpit, Cucumber, Fitnesse, but the disclosure is not limited thereto.

According to exemplary embodiments, the process 900 may further include automatically generating the scenario patterns for a financial transaction processing system (FTPS) target architecture model, wherein a single scenario pattern demonstrates a single payments or receivables scenario feature as it progresses through various lifecycle points.

According to exemplary embodiments, the ASPGD 402 may include a memory (e.g., a memory 106 as illustrated in FIG. 1) which may be a non-transitory computer readable medium that may be configured to store instructions for implementing an ASPGM 406 for automatically generating scenario patterns as disclosed herein. The ASPGD 402 may also include a medium reader (e.g., a medium reader 112 as illustrated in FIG. 1) which may be configured to read any one or more sets of instructions, e.g., software, from any of the memories described herein. The instructions, when executed by a processor embedded within the ASPGM 406 or within the ASPGD 402, may be used to perform one or more of the methods and processes as described herein. In a particular embodiment, the instructions may reside completely, or at least partially, within the memory 106, the medium reader 112, and/or the processor 104 (see FIG. 1) during execution by the ASPGD 402.

According to exemplary embodiments, the instructions, when executed, may cause the processor 104 to perform the following: receiving a request to create new features in connection with development and/or testing of one or more applications; implementing an automatic scenario patterns generating tool in response to the received request; automatically generating scenario patterns corresponding to the new features by utilizing the automatic scenario patterns generating tool; outputting the scenario patterns in a predefined file format providing an end-2-end (E2E) view spanning multiple applications, state models and events; uploading the scenario patterns in the predefined file format onto a system different from the automatic scenario patterns generating tool; deploying corresponding application programming interface (API) on a private cloud to request the scenario patterns in the predefined file format from the system; and implementing the requested scenario patterns to create the new features.

According to exemplary embodiments, the system may be an application development tool, and the instructions, when executed, may further cause the processor 104 to perform the following: uploading the scenario patterns in the predefined file format onto the application development tool; deploying the API on the private cloud to request the scenario patterns in the predefined file format from the application development tool; implementing the requested scenario patterns as specification-by-example (SbE) to create the new features; and developing said one or more applications with the new features.

According to exemplary embodiments, the system may be an application testing tool, and the instructions, when executed, may further cause the processor 104 to perform the following: uploading the scenario patterns in the predefined file format onto the application testing tool; deploying the API on the private cloud to request the scenario patterns in the predefined file format from the application testing tool; implementing the requested scenario patterns to create test cases; and testing said one or more applications with the test cases.

According to exemplary embodiments, the instructions, when executed, may further cause the processor 104 to perform the following: automatically generating the scenario patterns for a financial transaction processing system (FTPS) target architecture model, wherein a single scenario pattern demonstrates a single payments or receivables scenario feature as it progresses through various lifecycle points.

According to exemplary embodiments as disclosed above in FIGS. 1-9, technical improvements effected by the instant disclosure may include a platform for implementing an automatic scenario pattern generating module that automatically generates visualization artifacts to articulate requirements, design and implementation for E2E transactions spanning multiple components or applications, but the disclosure is not limited thereto.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for automatically generating scenario patterns by utilizing one or more processors and one or more memories, the method comprising:
   receiving a request to create new features in connection with development and/or testing of one or more applications;
   implementing an automatic scenario patterns generating tool in response to the received request;
   automatically generating scenario patterns corresponding to the new features by utilizing the automatic scenario patterns generating tool;
   outputting the scenario patterns in a predefined file format providing an end-2-end (E2E) view spanning multiple applications, state models and events;
   uploading the scenario patterns in the predefined file format onto a system different from the automatic scenario patterns generating tool;

deploying corresponding application programming interface (API) on a private cloud to request the scenario patterns in the predefined file format from the system; and implementing the requested scenario patterns to create the new features, wherein the scenario patterns are transaction life cycle event and state modelling method or pattern having an E2E view spanning multiple components, applications, functions and use case scenarios specified with a view of completing a transaction E2E, and wherein output of the scenario patterns in a predefined file format is dependent upon the use case scenarios.

2. The method according to claim 1, wherein the system is an application testing tool, and the method further comprising:

uploading the scenario patterns in the predefined file format onto the application testing tool;

deploying the API on the private cloud to request the scenario patterns in the predefined file format from the application testing tool;

implementing the requested scenario patterns to create test cases; and testing said one or more applications with the test cases.

3. The method according to claim 2, wherein the testing tool includes one or more of the following testing tools: Cockpit, Cucumber, Fitnesse.

4. The method according to claim 1, wherein the system is an application development tool, and the method further comprising:

uploading the scenario patterns in the predefined file format onto the application development tool;

deploying the API on the private cloud to request the scenario patterns in the predefined file format from the application development tool;

implementing the requested scenario patterns as specification-by-example (SbE) to create the new features; and developing said one or more applications with the new features.

5. The method according to claim 1, further comprising:

automatically generating the scenario patterns for a financial transaction processing system (FTPS) target architecture model, wherein a single scenario pattern demonstrates a single payments or receivables scenario feature as it progresses through various lifecycle points.

6. The method according to claim 1, wherein the predefined file format includes one or more of the following: excel file format and proto message file format.

7. A system for automatically generating scenario patterns, the system comprising:

a processor; and a memory operatively connected to the processor via a communication interface, the memory storing computer readable instructions, when executed, cause the processor to:

receive a request to create new features in connection with development and/or testing of one or more applications;

implement an automatic scenario patterns generating tool in response to the received request;

automatically generate scenario patterns corresponding to the new features by utilizing the automatic scenario patterns generating tool;

output the scenario patterns in a predefined file format providing an end-2-end (E2E) view spanning multiple applications, state models and events;

upload the scenario patterns in the predefined file format onto a system different from the automatic scenario patterns generating tool;

deploy corresponding application programming interface (API) on a private cloud to request the scenario patterns in the predefined file format from the system; and implement the requested scenario patterns to create the new features, wherein the scenario patterns are transaction life cycle event and state modelling method or pattern having an E2E view spanning multiple components, applications, functions and use case scenarios specified with a view of completing a transaction E2E, and wherein output of the scenario patterns in a predefined file format is dependent upon the use case scenarios.

8. The system according to claim 7, wherein the system is an application testing tool, and the processor is further configured to:

upload the scenario patterns in the predefined file format onto the application testing tool;

deploy the API on the private cloud to request the scenario patterns in the predefined file format from the application testing tool;

implement the requested scenario patterns to create test cases; and test said one or more applications with the test cases.

9. The system according to claim 8, wherein the testing tool includes one or more of the following testing tools: Cockpit, Cucumber, Fitnesse.

10. The system according to claim 7, wherein the system is an application development tool, and the processor is further configured to:

upload the scenario patterns in the predefined file format onto the application development tool;

deploy the API on the private cloud to request the scenario patterns in the predefined file format from the application development tool;

implement the requested scenario patterns as specification-by-example (SbE) to create the new features; and develop said one or more applications with the new features.

11. The system according to claim 7, wherein the processor is further configured to automatically generate the scenario patterns for a financial transaction processing system (FTPS) target architecture model, wherein a single scenario pattern demonstrates a single payments or receivables scenario feature as it progresses through various lifecycle points.

12. The system according to claim 7, wherein the predefined file format includes one or more of the following: excel file format and proto message file format.

13. A non-transitory computer readable medium configured to store instructions for automatically generating scenario patterns wherein, when executed, the instructions cause a processor to perform the following:

receiving a request to create new features in connection with development and/or testing of one or more applications;

implementing an automatic scenario patterns generating tool in response to the received request;

automatically generating scenario patterns corresponding to the new features by utilizing the automatic scenario patterns generating tool;

outputting the scenario patterns in a predefined file format providing an end-2-end (E2E) view spanning multiple applications, state models and events;

uploading the scenario patterns in the predefined file format onto a system different from the automatic scenario patterns generating tool;

deploying corresponding application programming interface (API) on a private cloud to request the scenario patterns in the predefined file format from the system; and implementing the requested scenario patterns to create the new features, wherein the scenario patterns are transaction life cycle event and state modelling method or pattern having an E2E view spanning multiple components, applications, functions and use case scenarios specified with a view of completing a transaction E2E, and wherein output of the scenario patterns in a predefined file format is dependent upon the use case scenarios.

14. The non-transitory computer readable medium according to claim 13, wherein the system is an application testing tool, and wherein the instructions, when executed, cause the processor to further perform the following:

uploading the scenario patterns in the predefined file format onto the application testing tool;

deploying the API on the private cloud to request the scenario patterns in the predefined file format from the application testing tool;

implementing the requested scenario patterns to create test cases; and testing said one or more applications with the test cases.

15. The non-transitory computer readable medium according to claim 13, wherein the system is an application development tool, and wherein the instructions, when executed, cause the processor to further perform the following:

uploading the scenario patterns in the predefined file format onto the application development tool;

deploying the API on the private cloud to request the scenario patterns in the predefined file format from the application development tool;

implementing the requested scenario patterns as specification-by-example (SbE) to create the new features; and developing said one or more applications with the new features.

* * * * *